D. OKAMOTO.
PRESS.
APPLICATION FILED JAN. 21, 1918.
1,289,528.
Patented Dec. 31, 1918.
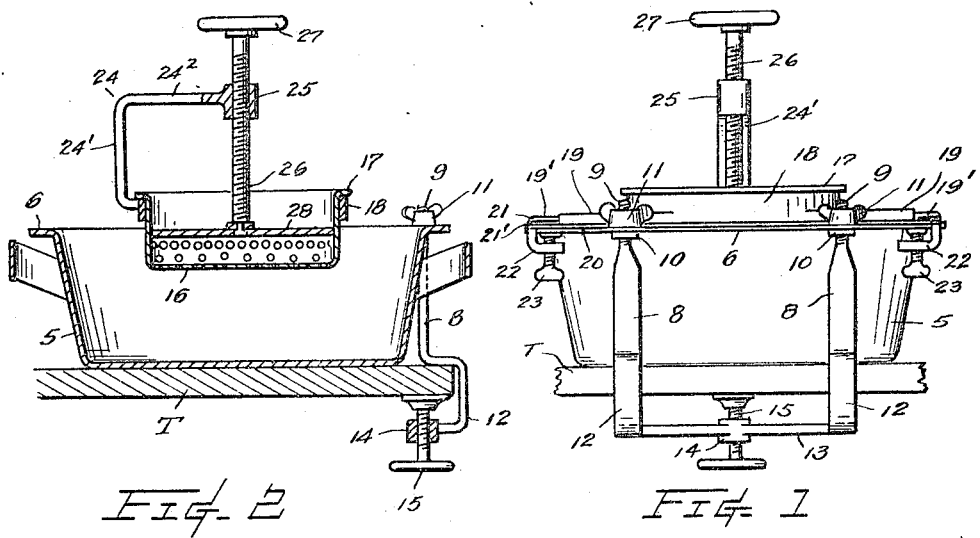
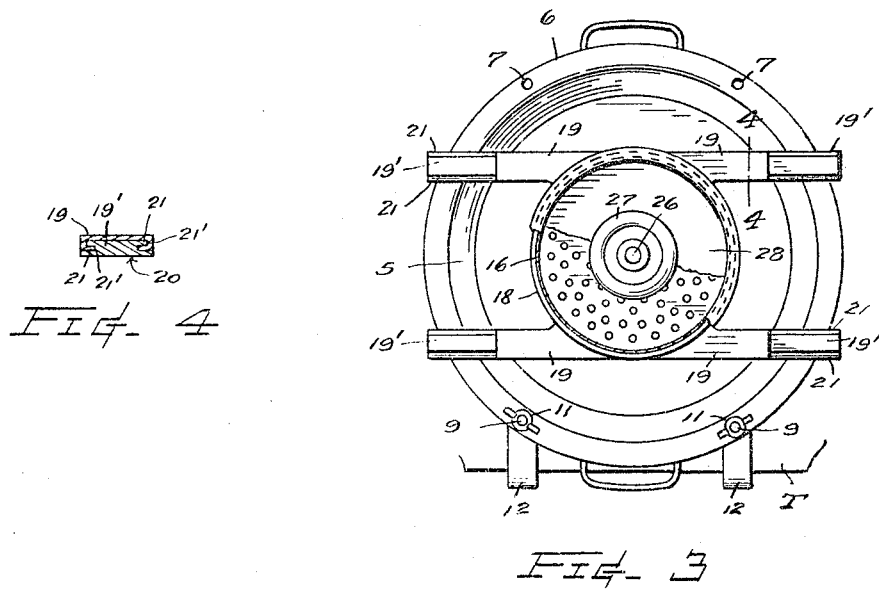
INVENTOR
Daitake Okamoto
BY
Pierre Barnes
ATTORNEY

UNITED STATES PATENT OFFICE.

DAITAKE OKAMOTO, OF NORTH YAKIMA, WASHINGTON.

PRESS.

1,289,528.

Specification of Letters Patent.

Patented Dec. 31, 1918.

Application filed January 21, 1918. Serial No. 212,891.

*To all whom it may concern:*

Be it known that I, DAITAKE OKAMOTO, a subject of the Emperor of Japan, residing at North Yakima, in the county of Yakima and State of Washington, have invented certain new and useful Improvements in Presses, of which the following is a specification.

This invention relates to kitchen utensils and, more especially, to devices for pressing the juice from fruit, mashing vegetables, etc. The object of the invention is the provision of efficient and inexpensively constructed devices of this character.

The invention consists in the novel construction of a press, the combination of the same with a juice receptacle, and in the appliances for coupling the same together and to a stand or table top.

In the accompanying drawings, Figure 1 is a front elevational view of devices embodying my invention. Fig. 2 is a longitudinal vertical section thereof. Fig. 3 is a plan view of Fig. 1 with parts of the press follower and colander broken away. Fig. 4 is a detail sectional view through 4—4 of Fig. 3.

The reference numeral 5 designates a receptacle in the nature, preferably, of an ordinary dish pan which, in this instance, has its rim 6 pierced with holes, such as 7. Said pan is rigidly secured to a table top T by means of a yoke or frame having two upright post elements 8 terminating in screw-threaded upper extremities 9 which extend through a selected pair of the rim holes 7. Nuts 10 threaded on the post parts 9 below the pan rim 6 and winged nuts 11 on such parts above the rim are employed to secure the pan to said yoke frame.

From the lower end of said posts, which bear upon the table top T, hook-shaped elements 12 extend below said top as shown in Figs. 1 and 2, and are connected by a transverse bar element 13 having intermediate its length an internally threaded boss 14 for a table-clamping screw 15.

16 represents a colander of substantially cylindrical shape provided with a peripheral rim 17 which rests upon the upper edge of an annular portion 18 of a supporting frame. This frame includes horizontal bar members 19 formed integral with or rigidly secured to annular portion 18 at diametrically opposite sides of the latter. Connected to said bar members are, respectively, extension members $19^1$ by slip joints (Fig. 4) comprising interfitting ribs and grooves 21, $21^1$ provided along the sides of the associated members. The members $19^1$ are formed to provide flat portions 20 to afford good bearing surfaces on the pan rim 6, and therebeyond are formed with hook-shaped ends having portions 22 disposed below the pan rim and provided with screw-threaded holes to accommodate fastening bolts 23 whereby the supporting frame is detachably connected to said pan. By providing extensible bar members the supporting frame is adapted to be used on pans of different diameters.

Constituting a part of the supporting frame is a standard 24 formed with an upright element $24^1$ from the upper end of which extends a horizontal element $24^2$ provided with an internally threaded extremity 25 arranged to have its axis in alinement with the axis of the frame portion 18 or that of the colander 16 when inserted in the frame.

26 represents a presser-screw engaging the threads in the frame part 25 and provided above the latter with an operating handle or wheel 27. The lower end of the presser screw is connected to a follower 28 in the form of an imperforate disk which fits within the colander 16.

To assemble the various parts, the yoke frame is first clamped to the table top T by means of the screw 15, and the pan 5 is then engaged to the yoke frame by placing the pan on the table to have the ends of frame posts 8 extend through holes provided in the pan rim 6. The nuts 10 are then regulated to be juxtaposed with the underside of the rim, when the pan is seated throughout its bottom on the table, whereupon the nuts 11 are screwed on the referred-to post ends hard down upon the pan rim.

The supporting frame is secured to the pan by the fastening bolts 23, as explained, and when the pan and supporting frame are thus coupled and secured to the table, colander 16 is introduced in the frame member 18, while the follower 28 is in its elevated position.

The material or substance to be pressed is then supplied to the colander, whereupon screw 26 is actuated through the agency of the hand wheel 27 to exercise a pressure against the material to mash the same and cause liquid thereof to be expelled through the colander perforations.

What I claim as my invention, is—

1. The combination with a dish pan, a frame having a standard member provided with a screw-threaded hole, means to clamp said frame to the pan, said frame being provided with an opening disposed centrally thereof, a colander removably supported by said frame within the referred-to frame opening, a follower provided to operate within the colander, and a screw engaging the screw threads of said frame hole for actuating the follower.

2. The combination with a pan, of a colander, a frame provided with a central opening to accommodate and support said colander, means to clamp said frame to said pan, said frame being provided with a standard having an internally screw-threaded portion disposed centrally over said frame opening, an upright presser-screw engaging in said screw-threaded portion of the standard, a follower connected to the lower end of the screw, and means provided on the upper end of said screw for actuating the same to raise or lower said follower.

3. The combination with a pan, and means engaging the rim thereof for removably securing the pan to a table-top, of a colander, a frame provided with a central opening to accommodate and support said colander, means to detachably secure said frame to said pan, said frame being provided with a standard having an internally screw-threaded portion disposed centrally over said frame opening, an upright presser screw engaging in said screw-threaded portion of the standard, a follower connected to the lower end of the screw, and means provided on the upper end of said screw for actuating the same to raise or lower said follower.

4. In apparatus of the class described, the combination with a colander and a receptacle having a peripheral rim, of a frame having a central opening to receive said colander and extensible bar members supported upon the receptacle rim, screw-bolts extending through threaded holes provided on said bar members for clamping the frame to the receptacle, a standard extending upwardly from said frame, said standard being provided with a screw-threaded hole, an upright presser-screw engaging in the last named hole, a follower provided on the lower end of the presser screw, and means provided on the upper end of said presser screw to rotate the latter to afford axial movement of the same with respect to said colander.

Signed at North Yakima, Wash., this 9th day of January, 1918.

DAITAKE OKAMOTO.

Witnesses:
HENRY H. TATEOKA,
TOKAZO MUROTA.

Copies of this patent may be obtained for five cents each, by addressing the "Commissioner of Patents, Washington, D. C."